United States Patent
Yli-Vakkuri

(10) Patent No.: US 7,155,939 B2
(45) Date of Patent: Jan. 2, 2007

(54) APPARATUS FOR BENDING GLASS PANELS

(75) Inventor: Erkki Yli-Vakkuri, Marin-Epagnier (CH)

(73) Assignee: Tamglass Ltd. Oy, Tampere (FI)

(*) Notice: Subject to any disclaimer, the term of this patent is extended or adjusted under 35 U.S.C. 154(b) by 581 days.

(21) Appl. No.: 10/458,203

(22) Filed: Jun. 11, 2003

(65) Prior Publication Data
US 2004/0050107 A1  Mar. 18, 2004

(30) Foreign Application Priority Data
Jun. 12, 2002  (FI)  ................................. 20021129

(51) Int. Cl.
*C03B 23/025* (2006.01)
*C03C 19/00* (2006.01)

(52) U.S. Cl. ............................ 65/349; 65/290; 65/291; 65/351

(58) Field of Classification Search ................ 65/273, 65/287, 290, 291, 349, 351
See application file for complete search history.

(56) References Cited

U.S. PATENT DOCUMENTS

| | | | |
|---|---|---|---|
| 2,794,300 A * | 6/1957 | Golightly | 65/158 |
| 2,967,378 A * | 1/1961 | Jones et al. | 65/107 |
| 4,497,645 A | 2/1985 | Peltonen | |
| 4,986,842 A | 1/1991 | Peltonen | |
| 5,173,102 A * | 12/1992 | Weber et al. | 65/273 |
| 5,364,436 A | 11/1994 | Montonen | |
| 5,470,367 A | 11/1995 | Salonen et al. | |
| 5,472,469 A | 12/1995 | Yli-Vakkuri et al. | |
| 5,858,047 A * | 1/1999 | Frank et al. | 65/104 |
| 5,876,477 A | 3/1999 | Bennett et al. | |
| 5,902,367 A | 5/1999 | Salonen | |
| 5,974,833 A | 11/1999 | Vähä-Antila et al. | |
| 6,983,624 B1 * | 1/2006 | Yli-Vakkuri | 65/274 |

FOREIGN PATENT DOCUMENTS

| | | |
|---|---|---|
| EP | 0 370 313 A1 | 5/1990 |
| EP | 0 592 862 A | 4/1994 |
| FI | 100397 B | 4/1997 |
| WO | WO 93/06052 | 4/1993 |

OTHER PUBLICATIONS

Finnish Search Report.

* cited by examiner

*Primary Examiner*—Steven P. Griffin
*Assistant Examiner*—Carlos Lopez
(74) *Attorney, Agent, or Firm*—Buchanan Ingersoll & Rooney PC

(57) ABSTRACT

The invention relates to an apparatus for bending glass panels. The upper tier of successive mould carriers defines a number of heating sections, the last one of which is an actual bending section. The lower tier of successive mould carriers defines a number of cooling sections, which are located below the heating sections. The mould carriers are provided with an open-structured or otherwise highly heat transmissive bottom. Underneath bending sections, effecting gravitational bending on an upper mould carrier track, lie cooling sections, each of which is individually provided with controlled cooling air circulation by means of cooling air exhaust fans. Following the sections performing the controlled cooling or annealing, the mould carriers are adapted to be conveyed along a lower mould carrier track nonstop under a plurality of preheating sections by a single passage.

10 Claims, 6 Drawing Sheets

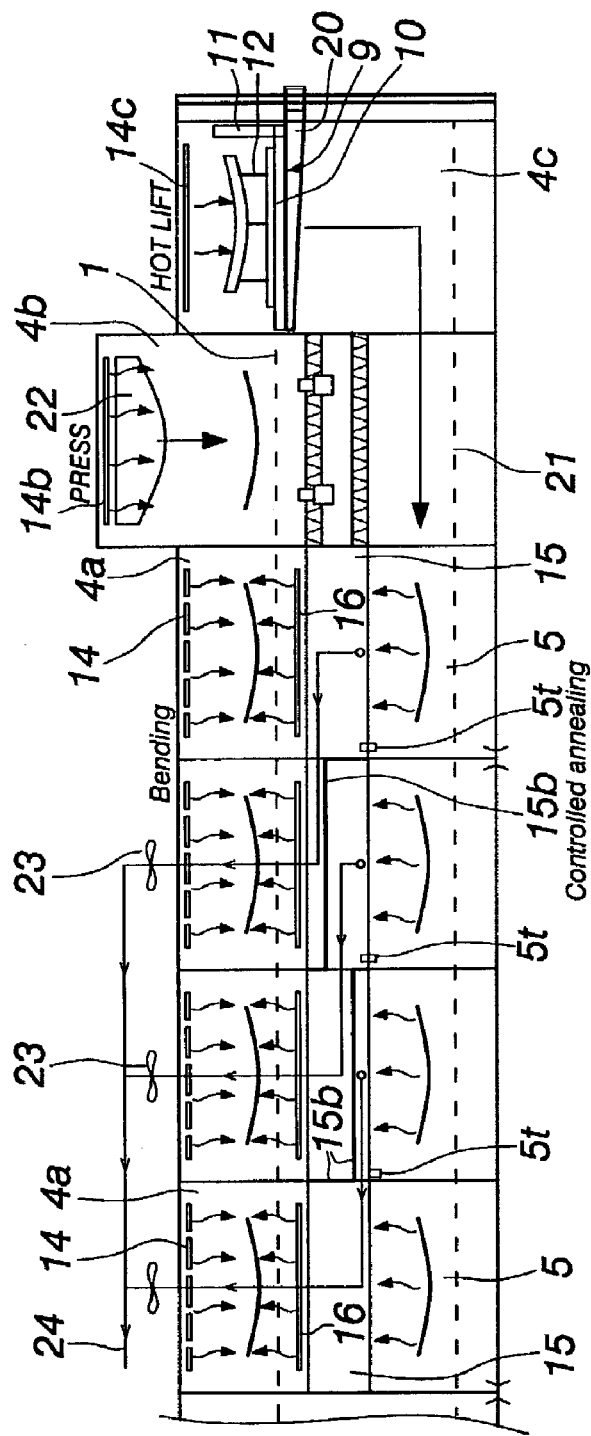
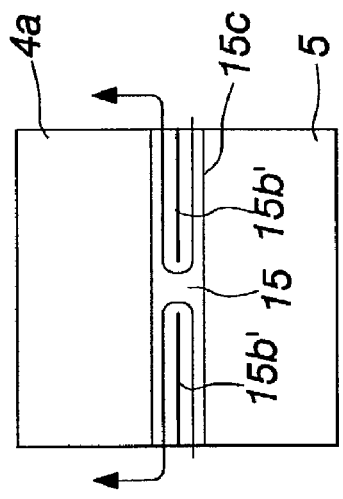
Fig.3
Fig.3a

APPARATUS FOR BENDING GLASS PANELS

The invention relates to an apparatus for bending glass panels, said apparatus comprising an upper mould carrier track, including successive mould carriers whose front or back wall separates successive heating sections and a plurality of successive bending sections from each other, the mould carriers being adapted to be intermittently conveyable towards a final bending section, having its ceiling provided with a descendable and hoistable male mould;

a lower mould carrier track, including successive mould carriers whose back or front wall separates successive cooling sections from each other, the mould carriers being adapted to be intermittently conveyable in the direction opposite to the conveying direction of mould carriers present on the upper track;

a number of bending moulds supported by the mould carriers;

preheating sections present in the upstream end of the upper mould carrier track, wherein the heating of glass panels is effected by means of forced convection, the thermal energy therefor being obtained from glass panels presently cooling in downstream end sections of the lower mould carrier track;

radiation heating means in the ceiling of the preheating sections, at least in some of the preheating sections;

radiation heating means in the ceiling of bending sections effecting gravitational sagging;

an intermediate floor for separating the bending sections and the preheating sections from sections present therebelow;

a lift mechanism for lowering the mould carriers from the upper track onto the lower track along with bent glass panels;

the mould carriers being provided with an open-structured or otherwise highly heat-transmitting bottom.

This type of apparatus is known from the Applicant's patent publications U.S. Pat. No. 4,497,645 and U.S. Pat. No. 4,986,842. Such apparatus has been found highly useful in the process of bending superimposed pairs of glass panels to be subsequently laminated together for use e.g. as an automotive windshield. In the early stages of preheating, it is possible to effectively exploit the heat delivered by glass panels presently annealing in cooling sections for heating glass panels to be heated in heating sections. This possibility no longer exists in the last preheating sections, since there will only be a small temperature difference between a pair of glass panels to be heated in a heating section and a pair of glass panels presently annealing therebelow. This is why the Applicant has already proposed in patent publication U.S. Pat. No. 5,902,367 that, following a bending operation, the mould carrier be conveyed under prebending sections directly to a position below the final preheating section. However, this arrangement does not provide for controlled cooling immediately after a bending operation in order to establish a sufficient edge stress or tension.

It is an object of the invention to provide an improved apparatus, wherein the cooling of a bent pair of glass panels immediately after a bending operation proceeds in a controlled fashion for establishing a sufficient edge tension, in addition to which the thermal energy delivered by glass panels upon annealing can be exploited effectively for the heating of glass panels to be heated on the upper track.

This object is achieved by the invention on the basis of the characterizing features set forth in the appended claim 1. Preferred embodiments of the invention have been disclosed in the dependent claims.

One exemplary embodiment of the invention will now be described in more detail with reference to the accompanying drawings, in which FIG. 1 shows the upstream end of an upper track and the downstream end of a lower track in an apparatus of the invention;

FIG. 3 shows the downstream end of an upper track and the upstream end of a lower track in an apparatus of the invention, the sections of FIGS. 1, 2 and 3 set one after the other constituting the entire apparatus;

Figure 1:
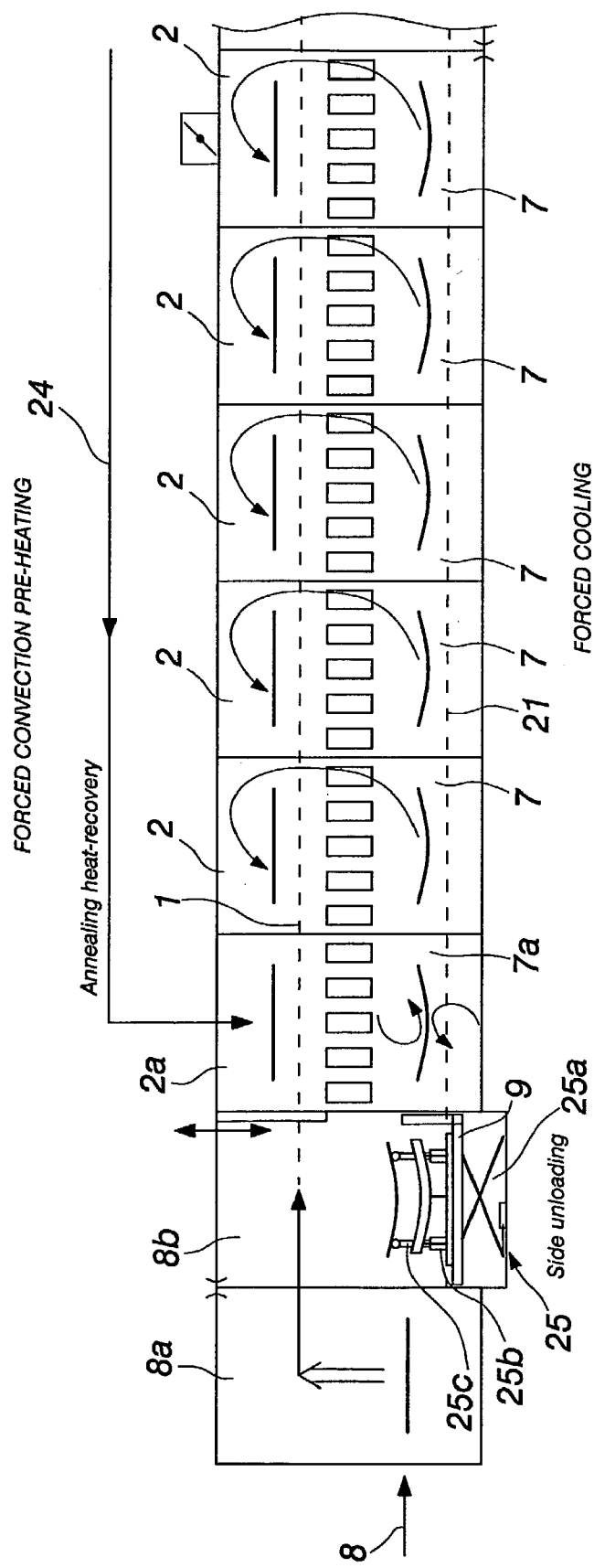
Figure 2:
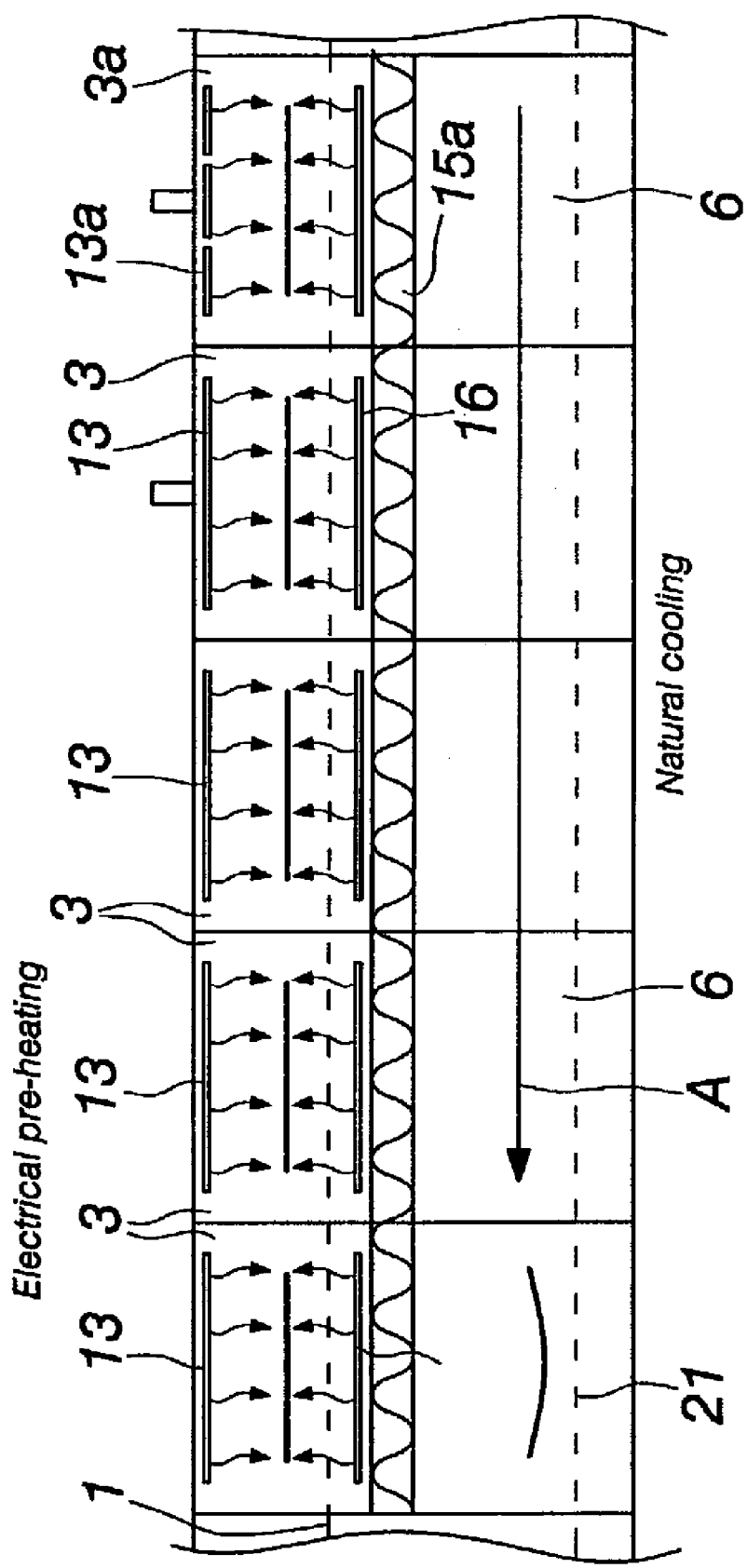
FIG. 2 shows the middle section of an upper track and the middle section of a lower track in an apparatus of the invention.

The apparatus of FIGS. 1–3 comprises an upper mould carrier track 1, including successive mould carriers 9 whose front or back wall 11 separates successive preheating sections 2, 3 and a plurality of successive bending sections 4a, 4b from each other. The mould carriers 9 are adapted to be intermittently conveyable towards a final bending section 4b, having its ceiling provided with a descendable and hoistable male mould 22. A lower mould carrier track 21 includes successive mould carriers 9 which lie underneath those of the upper track 1. The mould carriers 9 of the lower mould carrier track 21 have their back or front wall 11 separate successive cooling sections 5, 6, 7 from each other. The mould carriers 9 of the lower mould carrier track 21 are adapted to be intermittently conveyable in the direction opposite to the conveying direction of mould carriers present on the upper track.

Each mould carrier 9 is provided with a bending mould 12 supported by the mould carrier 9. A pair of glass panels is set on the bending mould 12 while the mould carrier is positioned outside the furnace in a loading and unloading section 8. The carrier 9, the mould 12, and the pair of glass panels to be bent are hoisted by means of a lift present in a section 8a following the loading and unloading section 8 up onto the upper track 1, along which the mould carriers are conveyed intermittently through a distance substantially equal to the carrier length at a time towards the bending section 4b. First in this passage are preheating sections 2, in which the heating is based on forced convection, the thermal energy of which is recovered from glass panels presently annealing by forced convection in bottom cooling sections 7. Thus, the cooling sections 7 can be used for speeding up the annealing of glass panels to be cooled and the heating sections 2 can be used for speeding up the heating of glass panels to be heated while exploiting more effectively the thermal energy of glass panels to be cooled. The structural and functional aspects of the sections 2 and 7 are described in more detail in the Applicant's patent publication U.S. Pat. No. 4,986,842. The difference in this case is that a first preheating section 2a is supplied with hot air by way of a duct 24 from upstream end cooling sections 5 of the lower track, each of which is individually provided with controlled cooling air circulation by means of exhaust fans 23. Providing the sections 5 with an individually regulable cooling air circulation enables cooling of a glass panel in a controlled fashion and establishing a sufficiently high edge tension.

From the sections 2 the upper level carriers 9 arrive in preheating sections 3, in which the principal heating of glass panels is effected by means of radiation heating. Therefor, the sections 3 have their ceilings provided with electrically heated radiation heating resistances 13. The sections 3 have a thermally insulated floor 15a, which constitutes an intermediate floor between the upper track sections 3 and lower track sections 6. On top of this intermediate floor 15a lie radiation heating elements 16 set below the level of the carriers' 9 bottom 10. The radiation heating elements 16 apply heat to the bottom panel in a pair of glass panels presently in the sections 3 through the open-structured bottom 10 of the carrier 9. The bottom 10 need not be a fully open structure, as it can be partially covered e.g. with a thin perforated sheet, a screen, or the like, which is transmissive both to convection air in the preceding sections 2 and to radiation heat from the heating elements 16.

Figure 6:
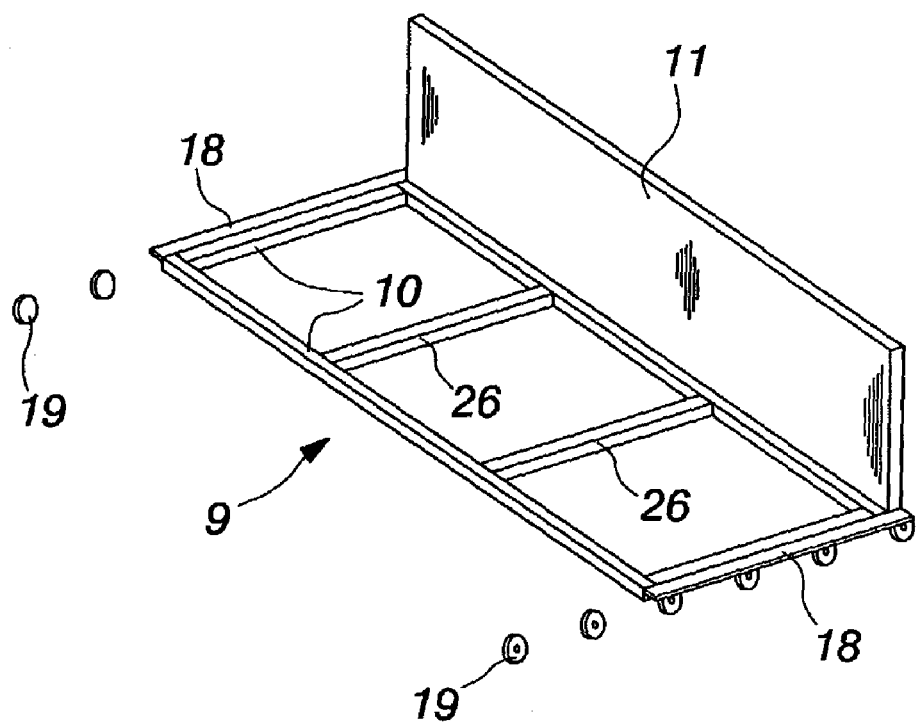
FIG. 6 shows in a schematic perspective view a mould carrier for use in the apparatus.

FIG. 6 illustrates rails 18 present at the ends of the carrier's 9 bottom frame 10, whereby the carriers 9 are propped on rollers 19, which are mounted with bearings on side walls 17 of the furnace (FIG. 7) and thus constitute the upper track 1 and the lower track 21.

Figure 7:
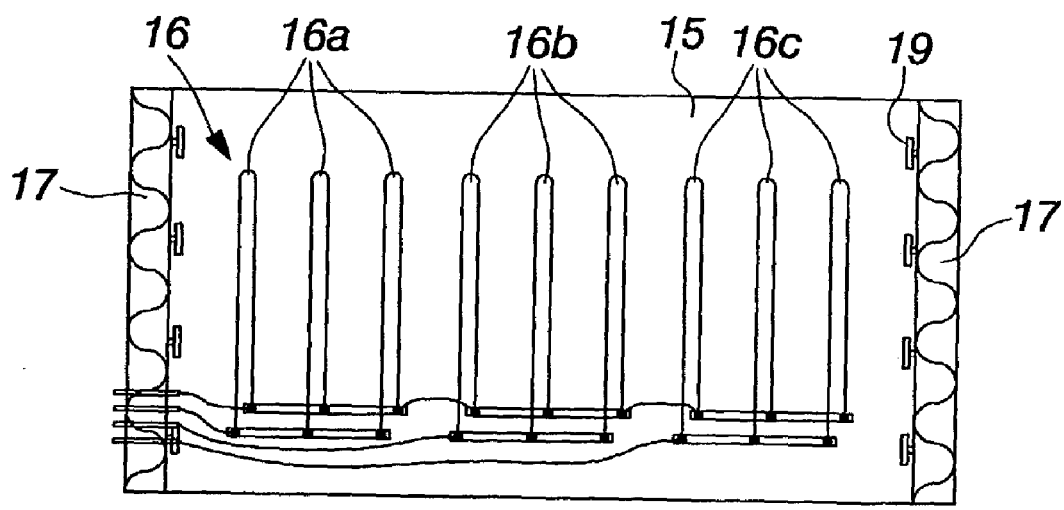
FIG. 7 shows in a plan view a floor for preheating sections 3 or prebending sections, having radiation heating elements 16 on top of it.

FIG. 7 shows an example regarding the radiation heating elements 16 present on top of the intermediate floors 15, 15a. Those can be open resistances, which are divided for resistance rod elements 16a, 16b side by side in the lateral direction of the sections and which have individually regulable heating effects.

The final preheating section 3a is followed by a number of prebending sections 4a, in which the temperate of a pair of glass panels rises to such a degree that the pair of glass panels begins to sag upon the ring 12 supporting the same. The number of prebending sections 4a is sufficient for the gravitational sagging to reach an ultimate bending form in the final prebending section 4a in the case of simple bending forms and almost an ultimate bending form in the case of complex bending forms. In the latter case the bending is finished by using a hoistable and descendable male mould 22 present in the bending section 4b for pressing a finished form or shape. The mould 22 is maintained at a sufficiently high temperature by resistances 14b. The bending temperature of glass is in the range of 590° C.–635° C.

Figure 4:
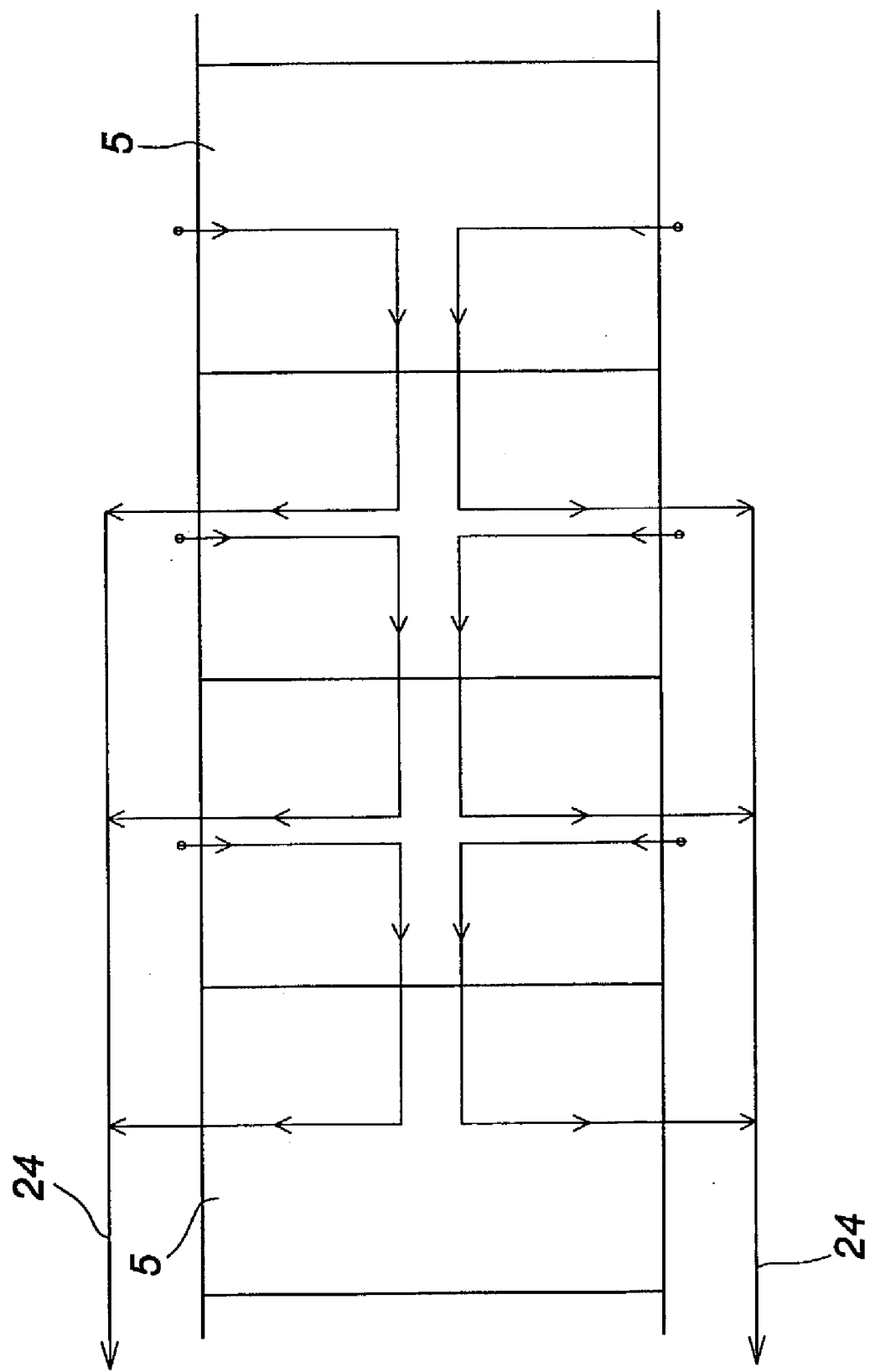
FIG. 4 is a plan view or horizontal section, depicting controlled cooling air circulation through the top portions of cooling sections 5 establishing the edge tension.
Figure 5:
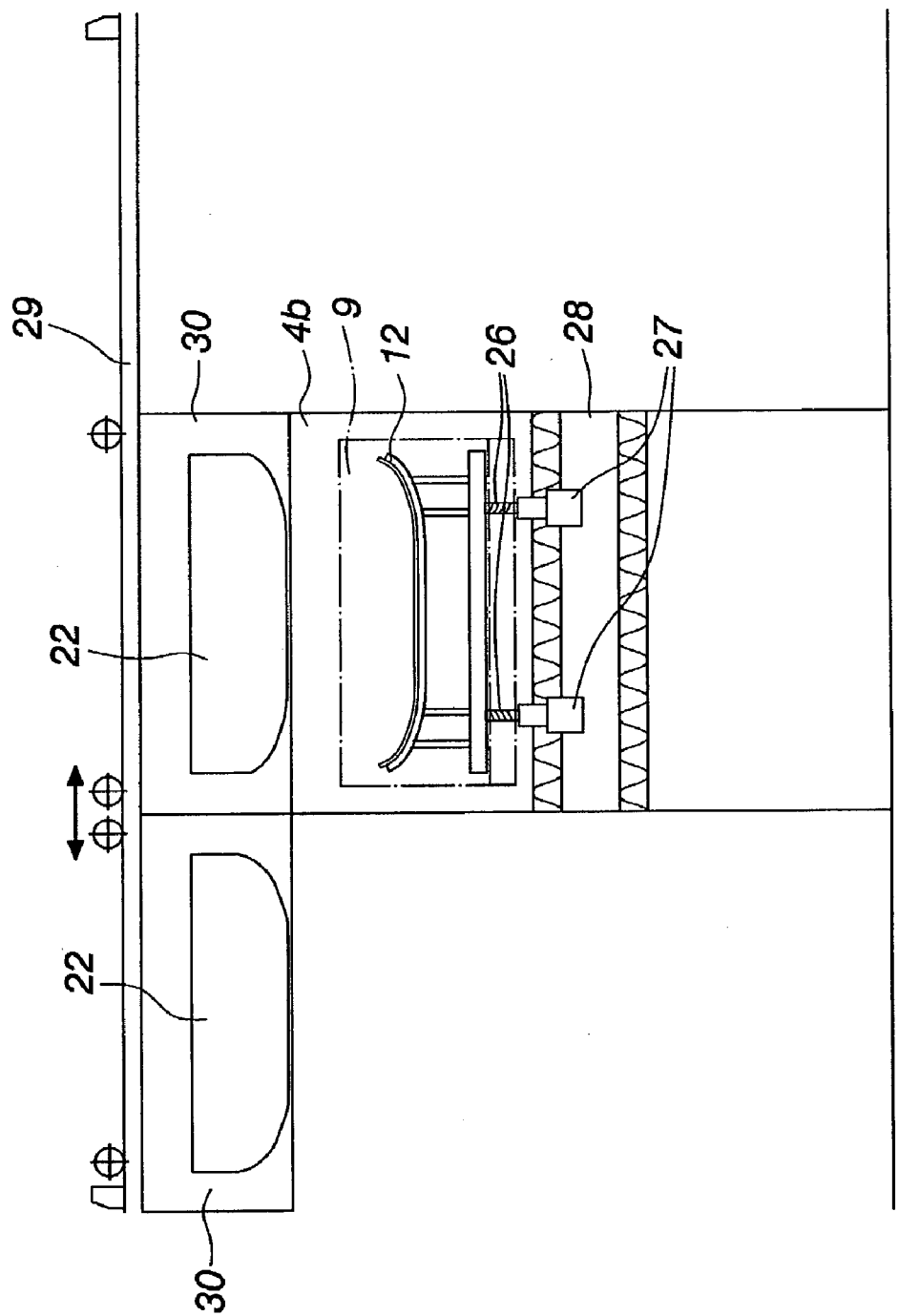
FIG. 5 shows a bending section 4b in cross-section.

Between the sections 4a and the cooling sections 5 therebelow is an intermediate floor 15, which is provided by encapsulation with a duct system for cooling air circulation. In line with three successive cooling sections 5, alongside the intermediate floor 15 is a cooling air intake which can be of a constant size or mechanically adjustable regarding its size. Bulkheads 15b included in the intermediate floors 15 are used for providing the intermediate floors 15 with a plurality of successive and separate cooling air flow boxes, whereby the flow of cooling air is individually controllable. FIG. 4 visualizes a flow pattern established by means of the intermediate floor structure of FIG. 3. On top of four sections 5 are established three successive cooling zones, which have an individual exhaust fan 23. The blowing capacity of each fan 23 is regulable by means of an inverter. FIG. 3a shows an alternative floor structure, in which the bulkheads 15b are used to establish a primarily crosswise circulation flow for cooling air. Thus, each section 5 has its individual exhaust fan 23, the blowing capacity of which is regulable by means of an inverter. Consequently, the successive cooling zones and/or sections 5 have cooling capacities individually adjustable. The cooling sections 5 can have their bottom below the glass panel provided with meandering cooling pipe systems, which are supplied with cooling air by fans from the opposite sides of the sections 5. The air heated in the cooling pipe systems is delivered by ducts to a heat recovery between the sections 2/7. Instead of cooling air, the cooling medium may comprise any flowing medium, e.g. water, the pipe system therefor being arranged in or below the intermediate floor 15 and possibly on the bottom of the cooling sections 5. The bottom surfaces of the intermediate floors 15, i.e. the bulkheads of respective cooling sections 5, provided with cooling air flow boxes or with flow pipes for other cooling medium, are fitted with thermal elements 5t for measuring glass temperatures and for regulating individually the operation of the cooling air exhaust fans 23 or the flow of some other cooling medium. The bottom surfaces of the intermediate floors 15, i.e. the bulkheads of the cooling sections, are preferably made of corrugated plate for an increased cooling area. In the cooling sections 5 the glass temperature is decreased typically to a temperature range of 450° C.–500° C.

Downstream of the cooling sections 5, the mould carriers 9 are adapted to be conveyed under a plurality of preheating sections 3a, 3 past sections 6 nonstop by a single passage, as indicated by an arrow A in FIG. 2. During this passage there occurs slight natural cooling until arriving in sections 7, in which the cooling is enhanced by forced convection.

The cooled glass panels are unloaded aside from the section 8b. Therefore, the section 8b is provided with a hoist mechanism 25 whose cylinders 25b, being supported by an articulated jack 25a, lift a glass panel off the mould to rest upon posts 25c. Then, a sideways mobile cradle (not shown) can pick up the glass panel from top of the posts 25c.

The resistances 14 present in the ceiling of the bending sections 4a comprise in a conventional manner resistances lengthwise of the furnace, which are divided for a plurality of groups successive in the longitudinal direction of the furnace. Each group contains a multitude of resistances side by side in the lateral direction of the furnace, which can be optionally switched on and off. Regulation regarding the resistance field of a bending section has been described in more detail in the Applicant's patent publication U.S. Pat. No. 5,470,367.

If a pair of glass panels sags to a desired form (simple bending forms) as early as in the final gravitational bending section 4a, it will be transferred directly through the press-bending section 4b into a lift section 4c. If necessary (more difficult bending forms), the section 4b is used to effect a press-bending operation by means of a press mould 22, followed by conveying the carrier 9 into the lift section 4c for lowering the carrier 9 by a lift mechanism 20 from the upper track 1 onto the lower track 21. At this point, the cooling of the pair of glass panels is still impeded by means of radiation heating resistances 14c, such that controlled cooling can be commenced in the first cooling section 5.

In order to make press bending at all possible with a light-structured hinge mould, which is typically used in gravitational bending and which is supported upon a light-structured carrier, it has been realized in the invention to prop or support the mould 12 upon the bending section's 4b bottom 28. This has been implemented as depicted in FIG. 4, such that the carrier 9 has its bottom fitted with mould levelling rods 26, the respective spots in the section's 4b bottom 28 being provided with pneumatic or hydraulic cylinders 27 for supporting the levelling rods 26 during a press-bending operation. The levelling rods 26 may also comprise other types of supporting means in shapes other than rods or bars or beam-like assemblies consisting of several components. The number of cylinders 27 is e.g. four and the number of levelling rods 26 is two located under the mould 12 at spots providing the best support therefor. As an alternative to the cylinders 27, it is possible to employ e.g. cam wheels mounted on shafts. The piston rods of cylinders 27 or the eccentric cams may themselves function as supports or may be included in the lifting and lowering mechanism of separate supports. What is essential is that the supports 27 can be lifted and lowered to make the same capable of supporting the mould carrying elements 26 or to release the same from the supporting position for moving the carrier 9 along the track 1. As shown in FIG. 4, the section 4b is provided with a replaceable ceiling 30 which houses the press mould 22. There are two such ceilings 30 side by side displaceable along a rail 29, which extends transversely to the direction of the tracks 1 and 21.

The invention claimed is:

1. An apparatus for bending glass panels, said apparatus comprising
   an upper mould carrier track, including successive mould carriers whose front or back wall separates successive heating sections and a plurality of successive bending sections from each other, the mould carriers being adapted to be intermittently conveyable towards a final bending section, the final bending section having its ceiling provided with a descendable and hoistable male mould;
   a lower mould carrier track, including successive mould carriers whose back or front wall separates successive cooling sections from each other, the mould carriers being adapted to be intermittently conveyable in the direction opposite to the conveying direction of mould carriers present on the upper track;
   a number of bending moulds supported by the mould carriers;
   first preheating sections present in the upstream end of the upper mould carrier track, wherein the heating of glass panels is effected by means of forced convection, the thermal energy therefor being obtained from glass panels presently cooling in downstream end sections of the lower mould carrier track under the first preheating sections;
   second preheating sections having radiation heating means in the ceiling of the second preheating sections, at least in some of the second preheating sections;
   radiation heating means in the ceiling of the bending sections effecting gravitational sagging;
   an intermediate floor for separating the bending sections and the second preheating sections from cooling sections present therebelow;
   a lift mechanism for lowering the mould carriers from the upper track onto the lower track along with bent glass panels;
   wherein the mould carriers are provided with an open-structured or otherwise highly heat-transmitting bottom,
   wherein the intermediate floor present between the bending sections effecting gravitational bending on the upper mould carrier track and the cooling sections present therebelow is provided with a plurality of successive cooling medium circulating means, through which the flow of a cooling medium is controllable for the controlled cooling of glass panels, and
   wherein downstream of the cooling sections provided with controlled cooling, the mould carriers are adapted to be conveyed along the lower mould carrier track under a plurality of the second preheating sections by a single nonstop passage, the length of which comprises more than one preheating section.

2. An apparatus as set forth in claim 1, wherein the cooling medium circulating means include cooling boxes in the intermediate floor and that the cooling medium comprises air, the flow of which through the cooling boxes is controllable by means of several exhaust fans associated with the successive cooling boxes.

3. An apparatus as set forth in claim 1, wherein on top of the intermediate floor lie radiation heating elements located below the level of the mould carrier's bottom.

4. An apparatus as set forth in claim 3, wherein the radiation heating elements lie on top of the intermediate floors of at least one preheating section and at least one prebending section.

5. An apparatus as set forth in claim 1, wherein in the downstream end of the lower mould carrier track, following the cooling sections which are subjected to cooling by forced convection, lies an unloading section, from which the glass panels are unloaded alongside the track and which is provided with a hoist mechanism for lifting a glass panel off the mould.

6. An apparatus as set forth in claim 5, wherein the hoist mechanism comprises an articulated jack and posts extensible and retractable by hydraulic cylinders supported by the articulated jack for lifting a glass panel.

7. An apparatus as set forth in claim 1, wherein the bottom surfaces of the intermediate floors define the bulkheads of the respective cooling boxes, and are provided with thermal elements for measuring glass temperatures and for regulating individually the flow of a cooling medium through said successive cooling medium circulating means.

8. An apparatus as set forth in claim 1, wherein the bottom surfaces of the intermediate floors define the bulkheads of the cooling sections, and are made of corrugated plate.

9. An apparatus as set forth in claim 1, wherein the cooling section has its bottom, below the glass panels, provided with a cooling medium pipe system, which is supplied with a cooling medium, from the opposite sides of the sections from outside of the sections.

10. An apparatus as set forth in claim 9, wherein the cooling medium pipe system is supplied with air.

* * * * *